T. E. MURRAY.
METHOD OF ELECTRICAL WELDING.
APPLICATION FILED JAN. 10, 1917.
1,220,774.
Patented Mar. 27, 1917.
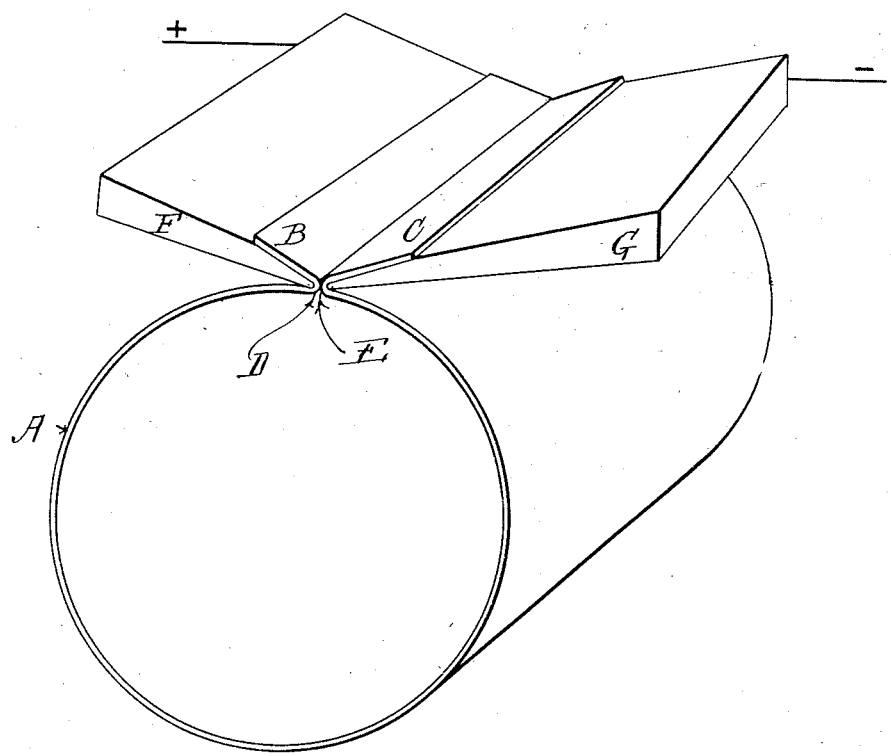
INVENTOR
Thomas E. Murray
BY Sara Benjamin
ATTORNEY

UNITED STATES PATENT OFFICE.

THOMAS E. MURRAY, OF NEW YORK, N. Y.

METHOD OF ELECTRICAL WELDING.

1,220,774. Specification of Letters Patent. Patented Mar. 27, 1917.

Application filed January 10, 1917. Serial No. 141,544.

*To all whom it may concern:*

Be it known that I, THOMAS E. MURRAY, a citizen of the United States, residing at New York, in the county of New York and State of New York, have invented a certain new and useful Improvement in Methods of Electrical Welding, of which the following is a specification.

My present invention is a method whereby a welded joint may be easily and quickly made in thin sheet metal.

The accompanying drawing is a perspective view of a sheet of thin metal bent in cylindrical form, and electrodes as arranged for carrying my method into effect.

A is a sheet of thin metal bent in cylindrical shape to form, for example, the wall of a can. I make this sheet longer than is necessary to produce the predetermined can circumference, and bend over and back each of the edges, as shown at B and C, so that when the exterior surfaces of the angles D, E at the bends are approximated, the desired length of can circumference will be obtained. I then insert within the bends the welding electrodes F, G, which are made of proper shape to fit therein, and press said electrodes together, in the usual way during the passage of the welding current. The welding then takes place at the surfaces D, E, and because the electrodes are made as long as the can, the whole seam is made instantaneously. After the electrodes are removed, the bent back portions at B and C may be flattened down upon the can, or, if desired, cut off.

I claim:

1. The method of forming an electrically welded seam in thin metal, which consists in first bending back an edge of each of the sheets to be welded, and then bringing the exterior faces of the angles formed by such bent edges into contact, and establishing welding current at the narrow joint formed at the contact areas of said faces.

2. The method of forming an electrically welded seam in a cylinder of thin metal, which consists in turning back opposite edges of a sheet of said metal, bending said sheet in cylindrical form and bringing the exterior surfaces of the angles formed by such bent edges into contact, and establishing welding current throughout the length of said joint.

In testimony whereof I have affixed my signature in presence of two witnesses.

THOMAS E. MURRAY.

Witnesses:
GERTRUDE T. PORTER,
MAY T. MCGARRY.